United States Patent
Evenor et al.

(10) Patent No.: US 10,690,692 B2
(45) Date of Patent: Jun. 23, 2020

(54) METHOD FOR LINKING THE SHAFT OF A TACHOMETER AND AN AIRCRAFT WHEEL

(71) Applicant: SAFRAN LANDING SYSTEMS, Velizy Villacoublay (FR)

(72) Inventors: Eric Evenor, Velizy Villacoublay (FR); Nathanael Richard, Velizy Villacoublay (FR); Alain Roy, Velizy Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 33 days.

(21) Appl. No.: 15/728,912

(22) Filed: Oct. 10, 2017

(65) Prior Publication Data
US 2018/0106823 A1    Apr. 19, 2018

(30) Foreign Application Priority Data
Oct. 13, 2016    (FR) ..................................... 16 59914

(51) Int. Cl.
| | |
|---|---|
| *G01P 1/04* | (2006.01) |
| *F16D 1/108* | (2006.01) |
| *F16D 3/76* | (2006.01) |
| *B64C 25/36* | (2006.01) |
| *B64C 25/34* | (2006.01) |

(52) U.S. Cl.
CPC ................ *G01P 1/04* (2013.01); *B64C 25/36* (2013.01); *B64C 25/34* (2013.01)

(58) Field of Classification Search
CPC ............ B60G 2204/115; F16C 41/007; F16C 33/723; F16C 19/186; F16C 2326/02; G01P 3/443; G01P 1/026; G01P 3/487; G01D 5/06; G01D 5/2013; G01D 11/245
See application file for complete search history.

(56) References Cited

U.S. PATENT DOCUMENTS

| | | | | |
|---|---|---|---|---|
| 3,540,232 | A | * 11/1970 | Breuer | .................... F16D 3/226 464/146 |
| 3,960,248 | A | 6/1976 | Tribe | |
| 5,583,431 | A | * 12/1996 | Ouchi | .................... G01P 3/443 324/174 |

(Continued)

FOREIGN PATENT DOCUMENTS

| | | |
|---|---|---|
| FR | 2 825 322 A1 | 12/2002 |
| FR | 2 835 060 A1 | 7/2003 |
| FR | 2 885 699 A1 | 11/2006 |

OTHER PUBLICATIONS

French Search Report for FR 16 59914, dated Jun. 27, 2017.
French Written Opinion for FR 16 59914, dated Oct. 13, 2016.

*Primary Examiner* — Brandi N Hopkins
(74) *Attorney, Agent, or Firm* — Sughrue Mion, PLLC

(57) ABSTRACT

The invention relates to a method for linking an end (9) of a shaft (8) of a tachometer (7) positioned in a landing gear hub (1) and a wheel (2) mounted to rotate on said hub, the method comprising the step of equipping the wheel with a housing (14) suitable for receiving the end of the shaft of a tachometer and driving the shaft in rotation with the wheel, the housing comprising a bearing member (17) protruding inside the housing to be pushed back by the end of the shaft against an elastic member (18) to take up any play between the end of the shaft and the housing. The invention also relates to a bush ensuring application.

4 Claims, 3 Drawing Sheets

(56) References Cited

U.S. PATENT DOCUMENTS

| | | | | |
|---|---|---|---|---|
| 6,053,046 | A | * | 4/2000 | Masaki ................ F16C 33/723 |
| | | | | 324/174 |
| 8,833,166 | B2 | * | 9/2014 | Yamashita .............. G01P 3/443 |
| | | | | 324/174 |
| 2002/0014888 | A1 | * | 2/2002 | Harada ................ G01D 5/2013 |
| | | | | 324/174 |
| 2004/0173014 | A1 | | 9/2004 | Pradier et al. |
| 2005/0039531 | A1 | | 2/2005 | Pradier |
| 2006/0254354 | A1 | * | 11/2006 | Maes ..................... F16D 1/108 |
| | | | | 73/514.39 |
| 2013/0091969 | A1 | * | 4/2013 | Bucheton ............. B64C 25/405 |
| | | | | 74/405 |

\* cited by examiner

METHOD FOR LINKING THE SHAFT OF A TACHOMETER AND AN AIRCRAFT WHEEL

The invention relates to a method for linking the shaft of a tachometer and an aircraft wheel.

BACKGROUND OF THE INVENTION

In the field of aircraft landing gear, it is common practice to measure the speed of rotation of the braked wheels to ensure the regulation of the braking. To this end, it is known practice to install a tachometer in the hub whose shaft protrudes from the hub such that its end is driven in rotation by a cap secured to the wheel. The tachometer delivers a signal representative of the speed of rotation of the wheel. To this end, the wheel cap comprises a central housing in which the end of the shaft of the tachometer is engaged. The driving is ensured by the non-circular section (for example hexagonal or splined) of the end of the shaft of the tachometer and of the housing. It has emerged that, at low speed, the signal from the tachometer is sometimes noisy to the point of not being able to be used effectively for the regulation of the braking.

Efforts have of course been made to try to filter the signal from the tachometer, but the noise is sometimes so great that it completely masks the useable information.

OBJECT OF THE INVENTION

The invention aims to propose a method for linking the shaft of a tachometer and the wheel which reduces the noise of the signal, in particular at low rotation speed.

SUMMARY OF THE INVENTION

In order to achieve this aim, a method is proposed for linking an end of a shaft of a tachometer positioned in a landing gear hub and a wheel mounted to rotate on said hub, the method comprising the step of equipping the wheel with a housing suitable for receiving the end of the shaft of a tachometer and driving the shaft in rotation with the wheel, the housing comprising, according to the invention, a bearing member protruding inside the housing to be pushed back by the end of the shaft against an elastic member to take up any play between the end of the shaft and the housing.

By virtue of the taking up of play thus implemented according to the invention, a spectacular reduction of the noise disturbing the signal from the tachometer at low speeds has been observed, to such an extent that tachometers declared unfit for service according to the current reception criteria once again deliver signals that are perfectly usable for the regulation of braking.

According to a particular feature, the housing comprises a splined input followed by a receptacle for a sleeve mounted to revolve in the receptacle. The bearing member is a snug inside the sleeve and the elastic member comprises a torsion spring acting on the sleeve to return it to a position in which the snug extends between two splines when the end is not engaged in the housing.

According to another particular feature, the housing is formed in the hollow body of a bush comprising a flange for fixing the bush to a cap secured to the wheel.

The invention also relates to a bush to be added to the aircraft wheel cap to receive and drive an end of a shaft of a tachometer housed in a landing gear hub bearing the wheel. The bush comprises a hollow body defining a housing in which the end is received. The housing comprises an input of section homologous to that of the end followed by a cylindrical receptacle receiving a sleeve which comes into continuity with the input of the housing to receive the end and which is mounted to rotate in the receptacle. The sleeve comprises a bearing member protruding towards the interior of the sleeve which extends so as to be pushed back by the end when the latter is engaged in the housing against a return force exerted by an elastic member.

BRIEF DESCRIPTION OF THE DRAWINGS

The invention will be better understood in light of the following description of an implementation of the invention, referring to the figures of the attached drawings in which.

DETAILED DESCRIPTION OF THE INVENTION

Figure 1:
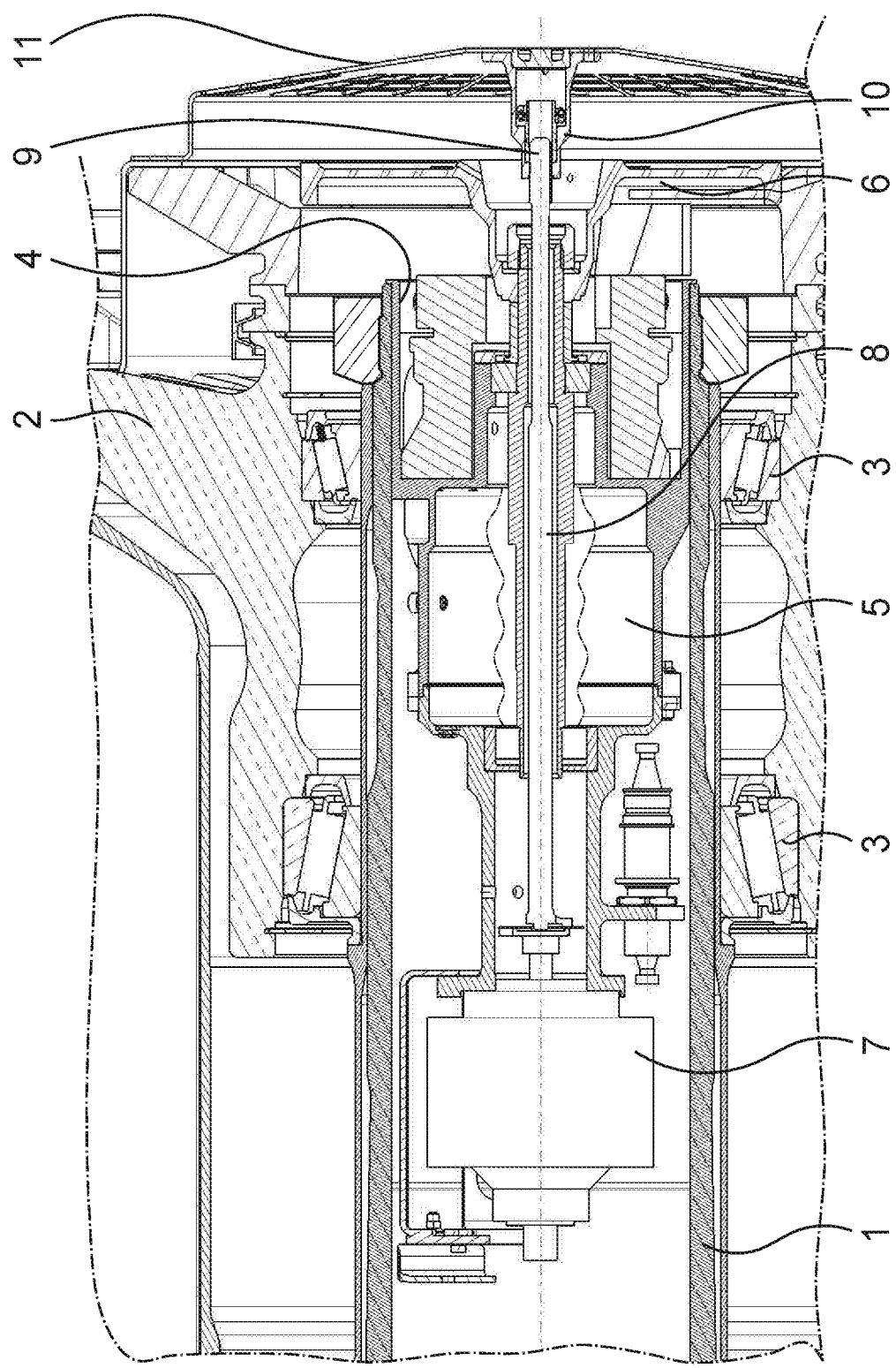
FIG. 1 is a cross-sectional view of a landing gear hub equipped with its wheel and a tachometer, with the driving bush according to the invention placed on the wheel cap.

The invention applies to a landing gear of which a hub 1 can be seen which receives a wheel 2 of which the rim provided with its rolling bearings 3 can be seen here. Inside the hub 1, a cartridge 4 is inserted comprising a motor 5 driving a fan 6, and, at the rear of the motor 5, a tachometer 7 whose shaft 8 can be seen passing through the motor 5 and the fan 6 to emerge outside the hub 1. The shaft 8 has a splined end 9 which is engaged in a bush 10 secured to a wheel protection cap 11 which is secured thereto. Thus, the rotation of the wheel drives the rotation of the shaft 8, which leads the tachometer 7 to generate a signal representative of the speed of the rotation of the wheel.

Figure 2:
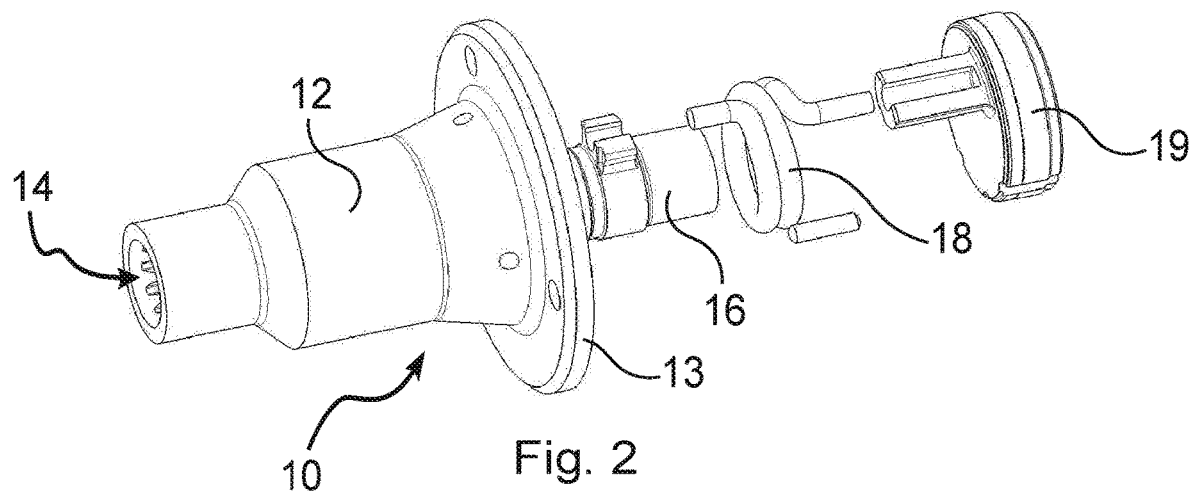
FIG. 2 is an exploded view of a bush according to the invention.
Figure 3:
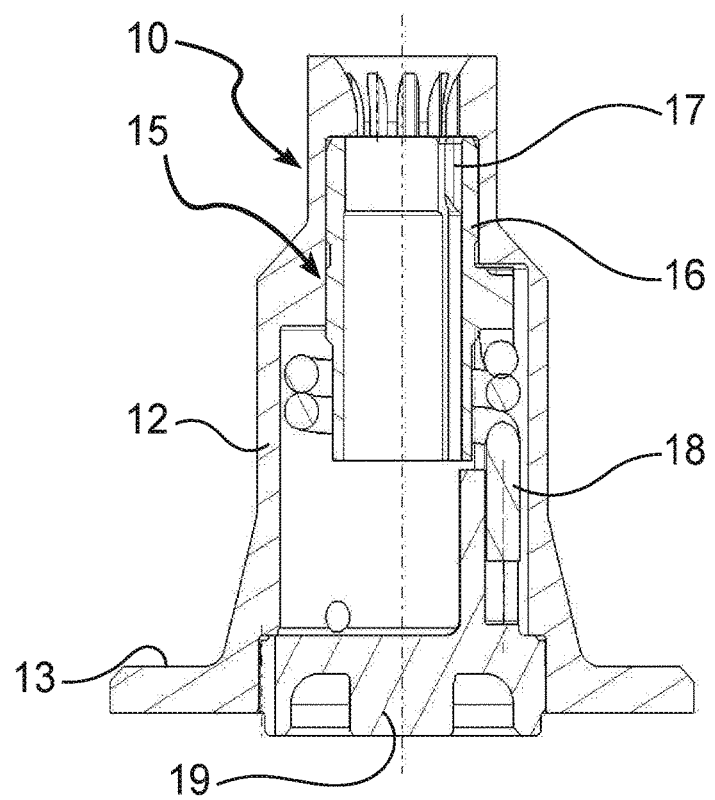
FIG. 3 is a cross-sectional view of the bush of FIG. 2.

Referring to FIGS. 2 and 3, the bush 10 comprises a hollow body 12 terminated by a flange 13 allowing it to be screwed onto the cap 11. The hollow body 12 defines a housing 14 having a splined input for receiving the end 9 of the shaft 8. After the input, the housing 14 defines a cylindrical receptacle 15 which receives a sleeve 16 which comes into continuity with the input of the housing 14 to receive the end 9 of the shaft 8. The sleeve 16 comprises an internal snug 17. The sleeve 16 is mounted to revolve in the cylindrical receptacle 15 by being linked to a plug 19 which closes the interior of the hollow body 12 by means of a torsion spring 18, serving as an elastic member, which returns the sleeve 16 to an angular position in which the snug 17 protrudes between two splines of the input of the housing 14 when the end 9 of the shaft 8 is not engaged in the housing.

Figure 4A:
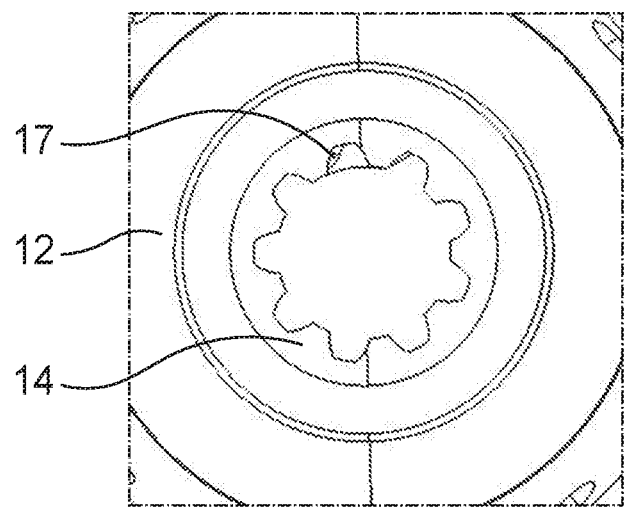
FIGS. 4A and 4B are front views showing the interior of the housing of the bush, before the introduction of the end of the shaft of the tachometer, and after the introduction thereof.
Figure 4B:
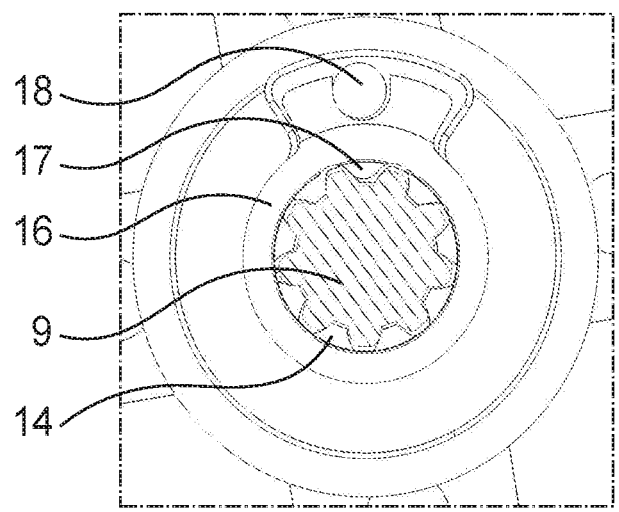

FIG. 4A shows the snug 17 which protrudes between two splines of the housing. Upon the introduction of the splined end 9 of the shaft 8 illustrated in FIG. 4B, the splines of the end 9 going to the matching splines at the input of the housing 14, then, continuing to enter, push back the snug 17, thus forcing the sleeve 16 to revolve in its receptacle 15 against a return force exerted by the torsion spring 18. By reaction, the snug 17 bears on the splines of the end 9 of the shaft 8 to press them against the matching splines of the housing 14, thus taking up any play between the splines of the housing 14 and the splines of the end 9. This arrangement brings about a notable reduction of the noise interfering with the signal from the tachometer.

It will be noted that the input of the housing 14 is of flared form, allowing a slight swivelling of the end 9 of the shaft 8 in the housing 14, which contributes to reducing the stresses on the shaft 8 and thus reducing the production of noise interfering with the signal from the tachometer. Also to allow this slight swivelling, the length of the splines of the housing 14 have been reduced to the strict minimum to accept a slight angle between the axis of the shaft 8 and the central axis of the housing 14. These arrangements make it possible to absorb a flexing of the hub on landing and in taxiing, due to the forces that the ground applies to the wheel borne by the hub.

The invention is not limited to what has just been described that encompasses any variant falling within the scope defined by the claims.

In particular, although here the housing forms part of a bush 10 added to the wheel cap, it will more generally be possible to equip the wheel with a housing with a bearing member coming to bear on the end of the shaft against the action of an elastic member for taking up any play between the end of the shaft and the housing.

The invention claimed is:

1. A method for linking an end of a shaft of a tachometer positioned in a landing gear hub and a wheel mounted to rotate on said hub, the method comprising;
    a step of equipping the wheel with a bush comprising a hollow body defining a housing suitable for receiving the end of the shaft of the tachometer and driving the shaft in rotation with the wheel, the housing comprising a receptacle in which a sleeve is mounted to rotate and the sleeve having a bearing member protruding inside the housing to be pushed back by the end of the shaft of the tachometer when the end of the tachometer shaft is engaged in the housing against a return force exerted by an elastic member to take up any play between the end of the shaft of the tachometer and the housing.

2. The method according to claim 1,
    wherein the housing comprises a splined input followed by a receptacle for a sleeve mounted to revolve in the receptacle,
    wherein the bearing member is snug inside the sleeve, and
    wherein the elastic member comprises a torsion spring acting on the sleeve to return it to a position in which the snug extends between two splines when the end of the shaft of the tachometer is not engaged in the housing.

3. The method according to claim 1, in which the bush comprises a flange for fixing the bush to a cap secured to the wheel.

4. A bush for an aircraft wheel cap to receive and drive an end of a tachometer shaft housed in a landing gear hub bearing the wheel, the bush comprising:
    a hollow body defining a housing in which the end of the tachometer shaft is received, the housing having an input of section matching that of the end of the tachometer shaft followed by a cylindrical receptacle which receives a sleeve which comes into continuity with the input of the housing to receive the end of the tachometer shaft and which is mounted to rotate in the cylindrical receptacle, the sleeve having a bearing member protruding towards an interior of the sleeve which extends so as to be pushed back by the end of the tachometer shaft when the end of the tachometer shaft is engaged in the housing against a return force exerted by an elastic member.

* * * * *